United States Patent [19]

Piotrowski

[11] E Patent Number: Re. 32,169

[45] Reissued Date of Patent: Jun. 3, 1986

[54] THERMAL EXCHANGER

[75] Inventor: Tadeusz Piotrowski, Vincennes, France

[73] Assignee: Etablissement Euroburner, Vaduz, Liechtenstein

[21] Appl. No.: 406,999

[22] Filed: Aug. 10, 1982

Related U.S. Patent Documents

Reissue of:

[64] Patent No.: 4,232,733
Issued: Nov. 11, 1980
Appl. No.: 39,553
Filed: May 16, 1979

U.S. Applications:

[63] Continuation of Ser. No. 817,034, Jul. 19, 1977, abandoned.

[30] Foreign Application Priority Data

Jul. 23, 1976 [CH] Switzerland ..... 9446/76

[51] Int. Cl.[4] ..... F28D 11/02; F28F 13/12

[52] U.S. Cl. ..... 165/89; 165/94; 165/109 R

[58] Field of Search ..... 165/88-90, 165/91, 109, 94; 122/11

[56] References Cited

U.S. PATENT DOCUMENTS

| | | | |
|---|---|---|---|
| 756,310 | 4/1904 | Willmann | 165/109 |
| 1,914,084 | 6/1913 | Ellis et al. | 165/91 |
| 2,169,601 | 8/1935 | Cornelius et al. | 122/11 |
| 2,372,502 | 3/1945 | Lehane et al. | 165/39 |
| 2,588,277 | 3/1952 | Neergaard et al. | 165/109 |
| 3,231,474 | 1/1966 | Jones et al. | 122/32 X |
| 3,255,084 | 6/1966 | Doroszlai | 165/39 |
| 3,302,701 | 2/1967 | Thomas | 165/109 |
| 3,354,944 | 11/1967 | Koelle | 165/109 |
| 3,382,917 | 5/1968 | Rice | 165/39 |
| 3,406,741 | 10/1968 | Leach | 165/1 |
| 3,479,689 | 11/1969 | Kurzke | 165/89 X |
| 3,495,951 | 2/1970 | Tanaka et al. | 165/91 |
| 3,542,112 | 11/1970 | Monty | 159/6.3 |
| 3,620,684 | 11/1971 | Brooks et al. | 165/109 |
| 3,667,542 | 6/1972 | Parkes | 165/89 |
| 3,690,302 | 9/1972 | Rennolds | 122/11 |
| 3,797,550 | 3/1974 | Latinen | 159/2.2 |
| 3,820,590 | 6/1974 | Littman et al. | 165/39 |
| 3,877,515 | 4/1975 | Laing | 165/86 |
| 3,910,346 | 10/1975 | ter Braak | 165/109 |
| 4,058,907 | 11/1977 | Lipp et al. | 165/109 X |
| 4,164,253 | 8/1979 | Skala | 165/1 |
| 4,187,904 | 2/1980 | Kuhnlein | 165/104.13 |
| 4,200,146 | 4/1980 | Olson | 165/39 |

FOREIGN PATENT DOCUMENTS

| | | | |
|---|---|---|---|
| 383332 | 8/1921 | Fed. Rep. of Germany . | |
| 1168930 | 4/1964 | Fed. Rep. of Germany . | |
| 838957 | 3/1939 | France . | |
| 1011684 | 4/1952 | France | 165/90 |
| 1155041 | 4/1958 | France . | |
| 1384653 | 11/1964 | France . | |
| 1581806 | 9/1969 | France . | |
| 4636431 | 12/1971 | Japan . | |
| 4637542 | 12/1971 | Japan . | |
| 136651 | 12/1919 | United Kingdom . | |
| 374941 | 6/1932 | United Kingdom . | |
| 383332 | 8/1921 | Fed. Rep. of Germany . | |
| 392350 | 5/1933 | United Kingdom . | |
| 586314 | 3/1947 | United Kingdom . | |
| 655157 | 7/1951 | United Kingdom . | |
| 700205 | 11/1953 | United Kingdom . | |
| 728330 | 4/1955 | United Kingdom . | |
| 988855 | 4/1965 | United Kingdom . | |
| 1012017 | 12/1965 | United Kingdom . | |
| 1204688 | 9/1970 | United Kingdom . | |

*Primary Examiner*—Sheldon J. Richter
*Attorney, Agent, or Firm*—Sandler & Greenblum

[57] ABSTRACT

A heat exchanger for heating or cooling a liquid, comprises a stationary outer shell and an drum rotatable coaxially in the shell. The outer periphery of the drum is adjacent the inner periphery of the shell and a stationary heat exchanger is disposed within the drum. Liquid to be heated or cooled is fed into the drum past the stationary heat exchanger and then between the outer periphery of the drum and the inner periphery of the shell. Impeller structure is disposed on [the] *and* extends axially along the outer periphery of the drum, such as a helicoidal vane, to [more] *move* the liquid is a circuitous path along the inner periphery of the stationary shell upon rotation of the drum.

30 Claims, 1 Drawing Figure

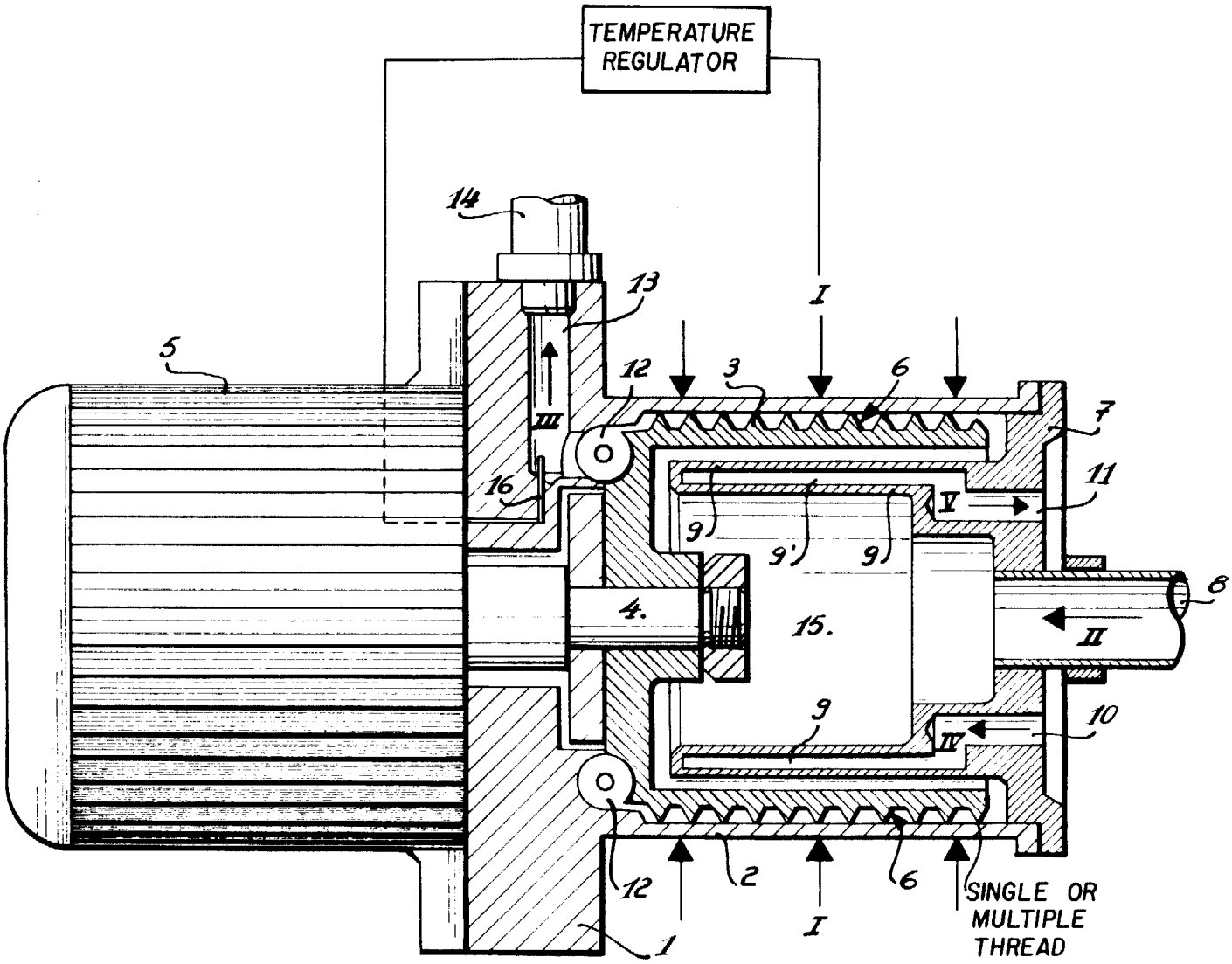
TEMPERATURE REGULATOR
SINGLE OR MULTIPLE THREAD
I
II
III
IV
V
1
2
3
4
5
6
7
8
9
9'
10
11
12
13
14
15
16

THERMAL EXCHANGER

Matter enclosed in heavy brackets [ ] appears in the original patent but forms no part of this reissue specification; matter printed in italics indicates the additions made by reissue.

This *is a reissue of Ser. No. 039,553, filed May 16, 1979 now U.S. Pat. No. 4,232,733, which* is a continuation, of application Ser. No. 817,034, filed July 19, 1977 now abandoned.

The present invention relates to a thermal exchanger for the heating or the cooling of a fluid, especially of a liquid to be brought at a determined temperature into a circuit of use.

It is known that the usual heating fluids can be decomposed little by little [by local] due to the direct contact with the heating surfaces of the used heating device. But in the industrial utilization of such heating fluids, and in order to increase to the maximum their heating velocity, it is generally admitted to heat the heating surfaces to temperatures much higher than those which are acceptable without any risk of decomposition of these fluids. That involves therefore the construction of boilers of large sizes presenting large heating surfaces, this being often disadvantageous either from the viewpoint of the required space or from that of the financial investments involved.

The purpose of this invention is to obviate the above mentioned drawbacks and consequently to provide a thermal exchanger for the heating or the cooling of a fluid, the sizes or which for the same power and efficiency are much smaller than those of the known devices.

The object of this invention, which intends to reach the above purpose, consequently consists in providing a thermal exchanger for the heating or the cooling of a fluid, which is characterized by the fact that it comprises a chamber provided with heating or cooling external means; driving means to circulate in a continuous manner and at a high speed the fluid in contact with the heated or cooled surfaces of the chamber; and means for bringing the heated or cooled fluid toward an external circuit of use.

The purpose of this invention is consequently achieved by the combination of a pump intended to circulate the fluid at a high speed in a boiler or a cooled chamber, and "scraping" or "wiping" means for the heating or cooling internal walls extended to prevent the local overheating or overcooling of the fluid in contact with these walls.

The thermal exchanger for the heating or the cooling of a fluid according to the invention will be now described by way of example and by reference to the single annexed drawing.

*Brief Description of Drawings*

*The FIGURE illustrates the invention with a single or multiple thread screw.*

In the embodiment shown schematically and partly in section in said drawing, the thermal exchanger, especially a heating device, comprises a boiler essentially constituted of a body 1 and a cylindrical part 2 perpendicular to said body 1, this cylindrical part being made of a good thermal conducting material and being heated by usual external means, shown here by the arrows I, for example by resistance electrical heating.

A drum 3 is concentrically mounted inside the cylindrical part 2 of the boiler and is driven in rotation by the shaft 4 of a motor 5, said shaft 4 corresponding to the central axis of said cylindrical part 2.

The external surface of the drum 3 is provided with an helicoidal spiral, this assembly forming an endless screw and the upper edge turning without contact immediately adjacent internal heating surface of the cylindrical part 2.

The helicoidal spiral 6 can be replaced in other embodiments by a single or multiple thread, for example trapezoidal, triangular or semicircular. Furthermore, the gap between the spiral or the thread 6 and the internal surface of the cylindrical part 2 will be as small as the machining limits and the used materials will allow, in order to prevent seizing.

The cylindrical part 2 of the boiler is further closed by an element 7, which is used as a cover and which is provided with a central feeding tube 8 and with two parallel cylindrical walls 9 near its periphery and extending, in the use position shown on the annexed drawing, inside the drum 3, and said both cylindrical walls defining between them a chamber 9'. The free end of said chamber 9' is closed and the other end joined with the cover 7 comprises two openings respectively inlet 10 and outlet 11 for a cooling fluid, for example water.

The boiler comprises further, at the intersection of the internal wall of the cylindrical part 2 and of the body 1, a peripheral pump 12, whereas the body 1 itself is bored with an outlet channel 13 connected to an outlet tube 14.

The fluid, for example a heating oil, which is intended to be heated at a determined temperature for its utilization in an external circuit, is introduced in the chamber 15, limited by the internal walls 9 of the chamber 9' by means of the feeding tube 8 and according to the arrow II. The oil passes then between the external wall 9 of said chamber 9' and the internal wall of the drum 3, and is then carried away by the spiral 6 of the rotating drum 3 acting in the same manner as a screw conveyor.

The spiral or thread 6 in used mainly to sweep away the external layer of the oil which tends to stay against the internal wall of the cylindrical part and thereby to hinder the heating of the rest of the oil due to its bad thermal conductivity. The thermal exchange for the heating of the circulating oil can therefore take place in an efficacious manner and without any risk of local overheating.

When the heated oil arrives near the body 1 of the boiler, carried away by the screw conveyor, it is sucked in for example by a peripheral pump 12, which forces it into the outlet channel 13 and then toward the external utilization circuit (not shown) through the outlet tube 14 (arrow III).

A thermometer 16 is further introduced for example in the outlet channel 13 so as to check the outlet temperature of the oil. The measurement of the temperature can also be used to control in function, through an automatic adjusting device, the control circuit of the external heating I intensity. Furthermore, in order to improve the efficiency of the thermostatization, it is also possible to bring under control of the thermometer 16 the adjusting of the temperature and/or the output of a refrigerating fluid circulating in the chamber 9' according to the arrows IV and V.

Of course, other embodiments (not shown) of the thermal exchanger according to the invention described above only by way of example can be considered. It is for example possible to use as means to circulate the liquid on the heating surfaces of the boiler scraping segments or other scraping and/or stirring means located immediately adjacent said surfaces; the peripheral pump described by reference to the annexed drawing can also be replaced by any other type of pumps, suction pump, gear pump, volumetric pump, etc.

The main advantage of the thermal exchanger for the heating of a fluid according to the invention is its ratio of size to heating velocity and efficiency. As a matter of fact, it is for example possible to apply a heating power higher than 10 W/cm$^2$ to the device according to the invention, in an embodiment of the size 15 cm×15 cm (driving motor not included), and with a circulating velocity of the liquid, for example a usual heating oil, of about 10 to 15 m/sec (rotational speed of the endless screw: about 3,000 turns/min); on the other hand, with a conventional device of the same size, the heating power applied could not exceed about [1,8] *1.8* W/cm$^2$, except with the risk of relatively fast decomposition of the oil.

Furthermore, in the thermal exchanger according to the invention, even in the case of voluntary or not stopping of the fluid circulation in the external circuit, said fluid continues to circulate on the heating surfaces, as long as the endless screw is driven in rotation, thus eliminating any risk of decomposition of the oil by overheating.

All the original elements of this invention, which have been mentioned in reference to the particular embodiment described, allow reduction of the size of a heating device of a fluid by a factor of about 5.

Of course, a device analogous to that described in reference to the single annexed drawing can be used as a thermal exchanger for the cooling of a fluid. For this, it is merely advisable on the one hand to replace the external heating means I by external cooling means, for example a circuit of a refrigerating fluid, and on the other hand to provide for the circulation of an heated fluid in the chamber 9' according to the arrows IV and V, so as to obtain a more efficacious thermostatisation.

The thermal exchanger according to the invention, when used as a cooling device for a fluid presents the advantages on one hand of allowing, as in the case of the heating device, an important reduction of the size with regards to the known devices, with the same cooling power and efficiency, and on the other hand to avoid, owing to the continuous forced circulation against the cooling walls, undesired modifications of the viscosity or even a partial [cristallization] *crystallization* of the fluid due to local overcooling.

Although the present invention has been described and illustrated in connection with a preferred embodiment, it is to be understood that modifications and variations may be restored to without departing from the spirit of the invention, as those skilled in this art will readily understand. Such modifications and variations are considered to be within the purview and scope of the present invention as defined the appended claims.

What I claim is:

1. A heat exchanger for heating or cooling a liquid, comprising a stationary outer shell, a drum rotatable coaxially in the shell, the outer periphery of the drum being adjacent the inner periphery of the shell, stationary heat exchange means within the drum, means to feed a liquid into the drum past said stationary heat exchange means and then between said outer periphery of said drum and said inner periphery of said shell, and impeller means on and extending axially along said outer periphery of said drum to move said liquid in a circuitous path along said inner periphery of said stationary outer shell upon rotation of said drum.

2. A heat exchanger as claimed in claim 1, said drum and shell being cylindrical.

3. A heat exchanger as claimed in claim 1, said impeller means comprising helicoidal screw means.

4. A heat exchanger as claimed in claim 1, said liquid flowing past said stationary heat exchange means in one axial direction and then flowing between said shell and drum in the opposite axial direction.

5. A heat exchanger as claimed in claim 1, said drum being open at one end, said liquid flowing within said drum in a direction toward said open end of said drum and then passing about said open end of said drum and then passing between said shell and said drum in a direction away from said open end of said drum.

6. A heat exchanger as claimed in claim 5, said stationary heat exchange means extending into said drum through said open end of said drum.

7. A heat exchanger as claimed in claim 1, one end of said drum being open, said stationary heat exchange means extending into said drum through said open end of said drum.

8. A heat exchanger as claimed in claim 1, and means outside said shell to heat the outer periphery of said shell.

9. A heat exchanger as claimed in claim 1, and pump means downstream of and coaxial with said impeller means for ejecting said liquid from said heat exchanger.

*10. For use in an exterior heat utilization circuit, a compact heat exchange unit comprising two fluid connections for connecting said unit with said utilization circuit for the input to and outlet of heat exchange fluid from said circuit, said unit comprising:*

*(a) a heating wall for heating said fluid and a heating chamber extending along said heating wall;*

*(b) means for heating said heating wall to provide more than about 1.8 W/cm$^2$ to said heat exchange fluid;*

*(c) a pump for circulating said fluid over said heating wall through said heating chamber; and*

*(d) stirring means for stirring said fluid circulating in said heating chamber and including means immediately adjacent to said heating wall for preventing localized overheating in said fluid resulting in decomposition thereof by sweeping said fluid from said heating wall.*

*11. The heat exchange unit as defined by claim 10 wherein said stirring means further comprises scraping means adapted to sweep away said fluid from said heating wall, thereby improving thermal exchange between said heating wall and said fluid.*

*12. The heat exchange unit as defined by claim 10 wherein said heating wall is cylindrical and said stirring means comprises a helicoidal spiral positioned immediately adjacent said heating wall.*

*13. The heat exchange unit as defined by claim 12 wherein said helicoidal spiral comprises a single or multiple thread.*

*14. The heat exchange unit as defined by claim 10 wherein said heating wall is cylindrical and said stirring means further comprising scraping means comprises a helicoidal spiral positioned immediately adjacent said heating wall adapted to sweep away said fluid from said heating wall, thereby improving thermal exchange between said heating wall and said fluid.*

*15. The heat exchange unit as defined by claim 10 comprising a gap between said stirring means and said heating wall as small as machining limits permit while nevertheless avoiding seizure of said stirring means by said heating wall.*

*16. The heat exchange unit as defined by claim 10 further comprising a second wall, said heating chamber being defined between said heating wall and said second wall.*

*17. The heat exchange unit as defined by claim 16 wherein said heating wall is cylindrical and said stirring means is a thread rotatably mounted on said second wall.*

*18. The heat exchange unit as defined by claim 17 wherein said stirring means further comprises an internal drum rotatably positioned coaxially within said cylindrical heating wall, said heating chamber being located in the space between the wall of said drum and said heating wall.*

*19. The heat exchange unit as defined by claim 18 wherein said connection for the input of said fluid is positioned to direct said fluid within and then around said internal drum into said heating chamber.*

*20. The heat exchange unit as defined by claim 10 further comprising cooling means within said drum for cooling said heat exchange fluid.*

*21. The heat exchange unit as defined by claim 10 further comprising cooling means for cooling said heat exchange fluid.*

*22. The heat exchange unit as defined by claim 21 wherein said heating wall is cylindrical and said unit further comprises an internal drum rotatably positioned coaxially within said cylindrical heating wall, said cooling means comprising a chamber mounted stationary within said internal drum.*

*23. The heat exchange unit as defined by claim 10 further comprising measuring means for measuring the outlet temperature of said heat exchange fluid and means for controlling the intensity of heat supplied by said heating wall to said fluid as a function of the outlet temperature of said fluid.*

*24. The heat exchange unit as defined by claim 10 further comprising cooling means for cooling said heat exchange fluid; means for measuring the outlet temperature of said fluid; and control means for controlling the amount of heat removed from said fluid by said cooling means as a function of the temperature of said fluid.*

*25. The heat exchange unit as defined by claim 10 in combination with said utilization circuit, said unit being adapted to heat said heat exchange fluid and to circulate said fluid through said circuit.*

*26. For use in an exterior heat utilization circuit, a compact heat exchange unit for circulating a heat exchange fluid in said utilization circuit; said unit comprising two fluid connections for connecting said unit with said utilization circuit for the input to and outlet of heat exchange fluid from said circuit, said unit further comprising:*

*(a) a heating wall for heating said fluid and a heating chamber extending along said heating wall for heating said fluid;*

*(b) means for heating said heating wall to provide more than about 1.8 W/cm$^2$ to said heat exchange fluid;*

*(c) stirring means for stirring said fluid circulating in said heating chamber and including means immediately adjacent to said heating wall for preventing localized overheating in said fluid resulting in decomposition thereof by sweeping said fluid from said heating wall; and*

*(d) in addition to said stirring means, a pump mounted coaxially with said stirring means, for circulating said fluid through said circuit and over said heating wall through said heating chamber.*

*27. For use in an exterior heat utilization circuit, a compact heat exchange unit for circulating a heat exchange fluid in said utilization circuit; said unit comprising two fluid connections for connecting said unit with said utilization circuit for the input to and outlet of heat exchange fluid from said circuit, said unit further comprising:*

*(a) a heating wall for heating said fluid and a heating chamber extending along said heating wall;*

*(b) means for heating said heating wall to provide more than about 1.8 W/cm$^2$ to said heat exchange fluid;*

*(c) stirring means for stirring said fluid circulating in said heating chamber and including means immediately adjacent to said heating wall for preventing localized overheating in said fluid resulting in decomposition thereof by sweeping said fluid from said heating wall; and*

*(d) in addition to said stirring means, a pump mounted coaxially with said stirring means and driven by a single common driveshaft with said stirring means, for circulating said fluid through said circuit.*

*28. For use in an exterior heat utilization circuit, a compact heat exchange unit for circulating and maintaining the temperature of a heat exchange fluid in said utilization circuit; said unit comprising two fluid connections for connecting said unit with said utilization circuit for the input and outlet of heat exchange fluid from said circuit, said unit further comprising:*

*(a) a heating wall for heating said fluid and a heating chamber extending along said heating wall;*

*(b) means for heating said heating wall to provide more than about 1.8 W/cm$^2$ to said heat exchange fluid;*

*(c) cooling means for cooling said heat exchange fluid;*

*(d) stirring means for stirring said fluid circulating in said heating chamber extending along said heating wall and including means immediately adjacent to said heating wall for preventing localized overheating in said fluid resulting in decomposition thereof by sweeping said fluid from said heating wall; and*

*(e) in addition to said stirring means, a pump mounted coaxially with said stirring means and driven by a single common drive shaft with said stirring means, for circulating said fluid through said circuit and over said heating wall through said heating chamber.*

*29. For use in an exterior heat utilization circuit, a compact heat exchange unit for circulating and maintaining the temperature of a heat exchange fluid in said utilization circuit; said unit comprising two fluid connections for connecting said unit with said utilization circuit for the input to and the output of heat exchange fluid from said circuit, said unit further comprising:*

*(a) a heating wall for heating said fluid and a heating chamber extending along said heating wall;*

*(b) means for heating said heating wall to provide more than about 1.8 W/cm$^2$ to said heat exchange fluid;*

*(c) cooling means for cooling said heat exchange fluid;*

*(d) means for sensing the output temperature of said heat exchange fluid from said unit and for regulating said cooling and heating means to maintain said fluid at a desired temperature;*

*(e) stirring means for stirring said fluid circulating in said heating chamber extending along said heating wall and including means immediately adjacent to said heating wall for preventing localized overheating in said fluid resulting in decomposition thereof by sweeping said fluid from said heating wall; and*

*(f) in addition to said stirring means, a pump mounted for circulating said fluid through said circuit and over said heating wall through said heating chamber.*

*30. For use in an exterior heat utilization circuit, a compact heat exchange unit for circulating and maintaining the temperature of a heat exchange fluid in said utilization circuit; said unit comprising two fluid connections for connecting said unit with said utilization circuit for input to and outlet of heat exchange fluid from said circuit, said unit further comprising:*

*(a) a heating wall for heating said fluid and a heating chamber extending along said heating wall;*

*(b) heating means for heating said heating wall to provide more than about 1.8 $W/cm^2$ to said heat exchange fluid;*

*(c) cooling means for cooling said heat exchange fluid;*

*(d) means for sensing the output temperature of said heat exchange fluid from said unit and for regulating said cooling and heating means to maintain said fluid at a desired temperature;*

*(e) stirring means for stirring said fluid circulating in said heating chamber extending along said heating wall and including means immediately adjacent to said heating wall for preventing localized overheating in said fluid resulting in decomposition thereof by sweeping said fluid from said heating wall, and means for operating said stirring means to provide a fluid velocity of at least about 10 meters/second through said heating chamber; and*

*(f) in addition to said stirring means, a pump mounted for circulating said fluid through said circuit and over said heating wall through said heating chamber.*

* * * * *